(12) United States Patent
Hauske et al.

(10) Patent No.: US 8,781,333 B2
(45) Date of Patent: Jul. 15, 2014

(54) CLOCK RECOVERY APPARATUS

(75) Inventors: Fabian Nikolaus Hauske, Munich (DE); Chan Zhao, Shenzhen (CN)

(73) Assignee: Huwei Technologies Co., Ltd., Shenzhen (CN)

( * ) Notice: Subject to any disclaimer, the term of this patent is extended or adjusted under 35 U.S.C. 154(b) by 229 days.

(21) Appl. No.: 13/366,044

(22) Filed: Feb. 3, 2012

(65) Prior Publication Data

US 2012/0177156 A1 Jul. 12, 2012

Related U.S. Application Data

(63) Continuation of application No. PCT/CN2009/073451, filed on Aug. 24, 2009.

(51) Int. Cl.
*H04B 10/00* (2013.01)

(52) U.S. Cl.
USPC .......................................................... 398/155

(58) Field of Classification Search
USPC .................................................. 398/155, 208
See application file for complete search history.

(56) References Cited

U.S. PATENT DOCUMENTS

| | | | |
|---|---|---|---|
| 5,541,958 A | 7/1996 | Ishizu | |
| 5,977,820 A | 11/1999 | Sogabe et al. | |
| 6,324,234 B1 | 11/2001 | Kiasaleh | |
| 6,487,252 B1 * | 11/2002 | Kleider et al. | 375/260 |
| 8,089,993 B2 * | 1/2012 | Wei et al. | 370/536 |
| 2007/0092260 A1 * | 4/2007 | Bontu et al. | 398/152 |
| 2013/0259493 A1 * | 10/2013 | Roberts | 398/208 |

FOREIGN PATENT DOCUMENTS

| | | |
|---|---|---|
| CN | 1212547 A | 3/1999 |
| WO | WO 2007/045071 A1 | 4/2007 |
| WO | WO 2007/086654 A1 | 8/2007 |

OTHER PUBLICATIONS

Extended European Search Report dated Sep. 26, 2012 in connection with European Patent Application No. 09848601.2, 6 pages.
Partial translation of Office Action dated May 6, 2013 in connection with Chinese Patent Application No. 200980159727.1.
International Search Report dated May 27, 2010 in connection with International Patent Application No. PCT/CN2009/073451.
Written Opinion dated May 27, 2010 in connection with International Patent Application No. PCT/CN2009/073451, 5 pages.
Singh, et al.; "Jitter and Clock Recovery for Periodic Traffic in Broadband Packet Networks"; IEEE Transactions on Communications, vol. 42, No. 5, May 1994, 8 pages.
Floyd M. Gardner; "A BPSK/QPSK Timing-Error Detector for Sampled Receivers" IEEE Transactions on Communications, vol. Com-34, No. 5, May 1986, 7 pages.
Robert Klinski, "Blind Channel Estimation for Multicarrier Transmission" Thesis http://tumbl.biblio.tu-muenchen.de/publ/diss/ei/2002/klinski.pdf; Mar. 6, 2002, 179 pages.

(Continued)

*Primary Examiner* — Leslie Pascal

(57) ABSTRACT

The invention relates to a clock recovery apparatus being configured to recover clock information from an input signal. The clock recovery apparatus comprises Fourier transforming means (201) being configured to transform the input signal into a frequency domain signal upon the basis of a Fourier transform, correlating means (215) being configured to correlate the frequency domain signal to obtain a correlation value associated with a certain frequency, and clock recovery means (217) being configured to determine whether the certain frequency corresponds to a clock frequency in order to recover the clock information.

13 Claims, 7 Drawing Sheets

(56) References Cited

OTHER PUBLICATIONS

Kuschnerov, et al.; "Adaptive Chromatic Dispersion Equalization for Non-Dispersion Managed Coherent Systems", IEEE, 2009, 3 pages.

Oerder, et al.; "Digital Filter and Square Timing Recovery", IEEE Transactions on Communications, vol. 36, No. 5, May 1988, 8 pages.

Kuschnerov, et al.; "Digital Timing Recovery for Coherent Fiber Optic Systems", IEEE, 2008, 3 pages.

Kuschnerov, et al.; "DSP for Coherent Single-Carrier Receivers", Journal of Lightwave Technology, vol. 27, No. 16, Aug. 15, 2009, 9 pages.

Kuschnerof, et al.; "Joint Equalization and Timing Recovery for Coherent Fiber Optic Receivers", IEEE Sep. 21-25, 2008, Brussels, Belgium, 2 pages.

Piyawanno, et al.; "Spectrum-based Frequency Offset Estimation for Coherent Receivers", Federal Armed Forces University Munick, Germany, 4 pages.

Office Action dated Apr. 4, 2013 in connection with Canadian Patent Application No. 2,767,074.

* cited by examiner

CLOCK RECOVERY APPARATUS

CROSS-REFERENCE TO RELATED APPLICATIONS

This application claims the benefit of International Application No. PCT/CN2009/073451, filed on Aug. 24, 2009, entitled "CLOCK RECOVERY APPARATUS" which is hereby incorporated by reference.

TECHNICAL FIELD

The present invention relates to clock recovery in communication systems.

BACKGROUND

In modern communication systems, timing recovery at a receiver is an essential issue for successful communication. Usually, at a transmitter, digital values sampled with a clock frequency are processed and transmitted, e.g. via an optical signal to a remote receiver. During transmission, the optical signal is impaired by polarization effects, dispersion, attenuation, noise and other effects. At the receiver, the clock frequency forming a time basis need to be recovered in order to capture the transmitted samples without introducing any further errors due to clock frequency mismatch. Time recovery errors may, in particular in optical transmission systems, further be introduced due to optical polarization effects like differential group delay (DGD), which may negatively affect the timing recovery accuracy. In particular, half-Baud DGD or multiples thereof in combination with certain states of polarization (SOP) may impose critical conditions for timing recovery. The timing recovery should be also robust to all optical and electrical distortions.

In order to recover the time basis, square-timing recovery (STR) may be performed in time domain. Essentially, the STR approach applies a nonlinear operation, e.g. the square of the signal, to obtain nonlinear mixing products, i.e. the clock tone. Prior to STR, a time domain filter which is a FIR filter (FIR: Finite Impulse Response) for enhancing spectral components around the clock frequency, i.e. the clock tone, may be applied. The filtered signal is then oversampled and squared to obtain the clock tone.

SUMMARY

A goal to be achieved by the present invention is to more efficiently recover time information from a received signal.

According to one aspect, a clock recovery apparatus is provided which is configured to recover a clock information from an input signal, for example from a received signal. The clock recovery apparatus comprises Fourier transforming means being configured to transform the input signal into a frequency domain signal upon the basis of the Fourier transform, correlating means being configured to correlate the frequency domain signal to obtain a correlation value associated with a certain frequency, and clock recovery means being configured to determine whether the certain frequency corresponds to a clock frequency in order to recover the clock information. In order to perform the Fourier transform, the Fourier transforming means may employ a digital Fourier transformer, e.g. a digital fast Fourier transformer (FFT). The correlating means may be configured to correlate the frequency domain signal according to any digital correlation processing scheme to obtain the correlation value. For example, a position of the correlation value indicated e.g. by an index among a plurality of correlation values may indicate the certain frequency in the frequency domain.

According to an implementation form, an estimation vector comprising correlation values may be defined by e.g. a cross-correlation between the signals according to the x- and the y-polarization and/or by the auto-correlation of each signal according to the x- and the y-polarization in the frequency domain. Furthermore, the combination of the cross- and auto-correlation may also provide an estimation variable forming a correlation value for extracting the timing phase and/or timing frequency information. Also correlations of the combination of the polarization signals, e.g. the sum of the x-polarization and the y-polarization, may provide estimation values being formed by the correlation values.

According to an implementation form, the correlation means may be configured to provide another correlation value upon the basis of the correlation of the frequency domain signal, the other correlation value being associated with another certain frequency, wherein the clock recovery means is configured to determine whether the other certain frequency corresponds to the clock frequency in order to recover the clock information. For example, the clock recovery means may compare the correlation value at the certain frequency and with the further correlation value at the further certain frequency in order to determine which correlation value is associated with a frequency corresponding to the clock frequency.

According to an implementation form, the clock recovery means may be configured to decide that the certain frequency corresponds to the clock frequency if the correlation value is greater than another correlation value. In order to make the decision, the clock recovery means may compare the correlation values or absolute values thereof or portions of the correlation values if the same are complex.

According to an implementation form, the clock recovery means may be configured to decide that the certain frequency corresponds to the clock frequency if the correlation value is greater than or equal to a certain threshold. By way of example, the clock recovery means may compare portions of the correlation value or an absolute value thereof to make the decision.

According to an implementation form, the clock recovery means may be configured to output a control signal indicating a change of a sampling frequency or sampling phase if the certain frequency does not correspond to the clock frequency. For example, the control signal may control a sampling frequency or phase of an analogue-to-digital converter using for sampling purposes. By way of example, this certain frequency does not correspond to the clock frequency if its value is e.g. lower than the certain threshold mentioned above or smaller than another correlation value associated with another certain frequency.

According to an implementation form, the correlation means may be configured to perform an auto-correlation of the frequency domain signal or of a portion thereof or to perform a cross-correlation of different portions of the frequency domain signal, in particular of different portions associated with different polarizations, to obtain the correlation value. By way of example, the correlation means may cross-correlate frequency domain portions being associated with a x-polarization and with a y-polarization.

According to an implementation form, the input signal may be a digitalized version of an optical signal having a first optical signal portion being associated with a first optical polarization, and a second optical signal portion being associated with a second optical polarization, wherein the frequency domain signal may comprise a first frequency domain signal portion being associated with the first polarization and a second frequency domain signal portion being associated with the second optical polarization, and wherein the correlation means is configured to auto-correlate the first or the second frequency domain signal portion or to cross-correlate the first frequency domain signal portion and the second frequency domain signal portion to obtain the correlation value. In order to perform the respective correlation process, the correlation means may execute any correlation algorithm providing correlation values.

According to an implementation form, the correlation means may be configured to weight at least a portion of the frequency domain signal or the correlation value with a weighting coefficient. The weighting coefficient may e.g. attenuate or amplify certain correlation values, e.g. the outmost correlation values.

According to an implementation form, the apparatus may further comprise a filter, in particular an all-pass filter for chromatic dispersion filtering, which is configured to filter the frequency domain signal and to provide a filtered frequency domain signal as the frequency domain signal to the correlating means. By way of example, the all-pass filter may perform the chromatic dispersion filtering in frequency domain.

According to an implementation form, the apparatus may further comprise an amplitude filter, in particular a band-pass filter, which is configured to filter the frequency domain signal and to provide a filtered frequency domain signal as the frequency domain signal to the correlating means. By way of example, the band-pass filter may perform the amplitude filtering in frequency domain.

According to an implementation form, the clock recovery means may further be configured to determining a clock phase upon a basis of the correlation value. For example, the clock phase may correspond to a phase of the correlation value if the same is a complex value. Thus, the clock phase may be determined by the real and the imaginary part of the correlation value.

According to an implementation form, the apparatus may further comprise oversampling means. The oversampling means may be configured to oversample the input signal prior to Fourier transformation. For example, the input signal may be oversampled four times by way of interpolation. Alternatively, oversampling means may be configured to oversample the signal after the Fourier transform in the frequency domain. For example, the frequency domain signal may be oversampled four times e.g. by zero-padding.

According to an implementation form, the apparatus may further comprise a Fourier transforming means being configured to transform the frequency domain signal into time domain to obtain a time domain signal for further processing.

According to another aspect, the invention provides a synchronization apparatus comprising analogue-to-digital converter means for sampling an analogue input signal with a sampling phase or frequency to obtain the input signal, and the inventive clock recovery apparatus which is configured to change the sampling phase or the sampling frequency of the analogue-to-digital converter means for synchronization. For example, the clock recovery apparatus may control the analogue-to-digital converter using the control signal mentioned above.

According to another aspect, the invention provides a synchronization apparatus comprising interpolation means for interpolating a digital signal with a sampling phase or frequency to obtain an interpolated signal, and the inventive clock recovery apparatus which is configured to change the sampling phase or the sampling frequency of the interpolation means for synchronization. For example, the clock recovery apparatus may control the interpolation filter using the control signal mentioned above.

According to another aspect, the invention provides a method for recovering clock information from an input signal. The method comprises transforming the input signal into a frequency domain signal upon the basis of the Fourier transform, correlating the frequency domain signal to obtain a correlation value associated with a certain frequency, and determining whether the certain frequency corresponds to a clock frequency in order to recover the clock information.

Further method steps are directly derivable from the functionality of the inventive clock recovery apparatus.

According to another aspect, the invention relates to a synchronization method comprising sampling an analogue input signal with a sampling phase or frequency to obtain the input signal, recovering clock information from the input signal according to the method for recovering clock information, and changing the sampling phase for the sampling frequency to synchronize with a frequency corresponding to the clock frequency.

Further method steps are directly derivable from the functionality of the inventive synchronization apparatus.

BRIEF DESCRIPTION OF THE DRAWINGS

Below, embodiments will be described with respect to the following figures, in which.

DETAILED DESCRIPTION

Figure 1:
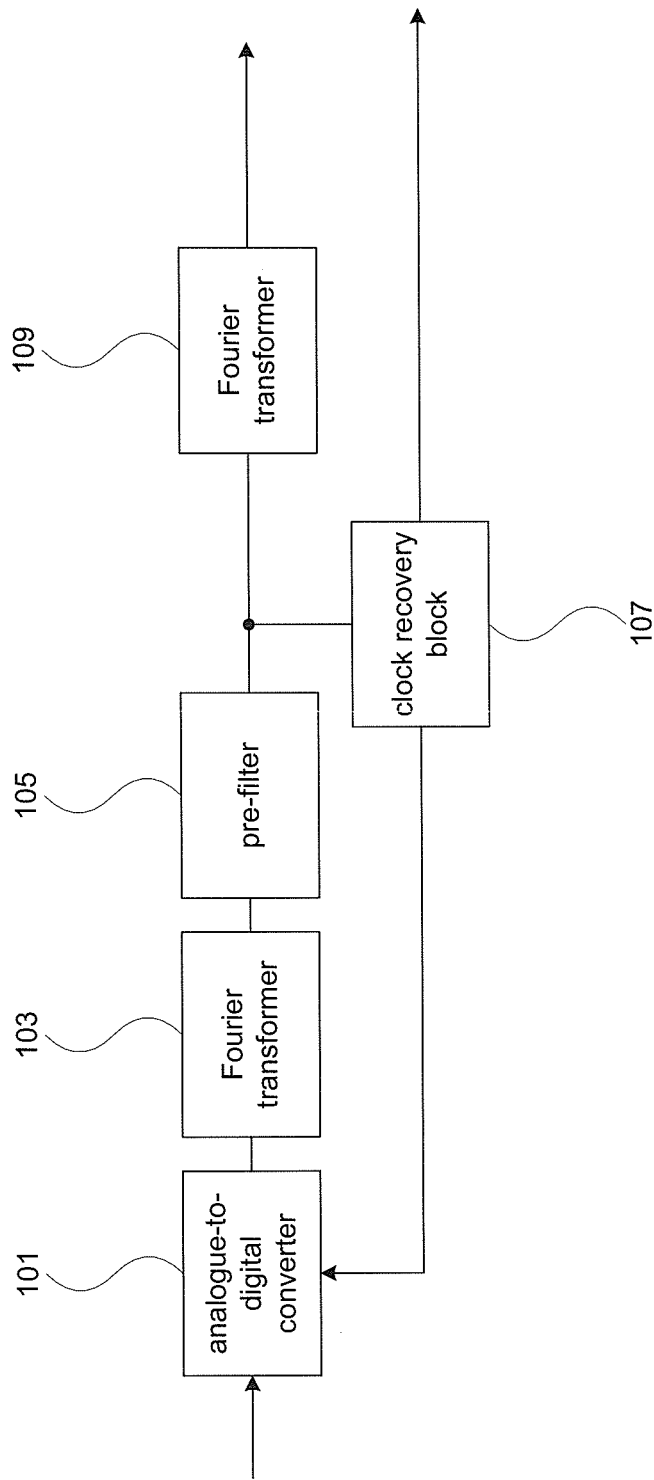
FIG. 1 shows a synchronization apparatus.

FIG. 1 shows a synchronization apparatus comprising an analogue-to-digital converter (ADC) 101 having an output coupled to a clock recovery apparatus. The clock recovery apparatus comprises Fourier transforming means (FT) 103, e.g. a Fourier transformer, for providing a frequency domain signal, and, optionally, a pre-filter (PF) being an all-pass filter or an amplitude filter or a combination thereof 105 for filtering the frequency domain signal. An output of the pre-filter 105 or an output of the Fourier transforming means 103 may be coupled to a clock recovery block (CRB) 107 comprising correlating means for correlating the frequency domain signal and clock recovery means for recovering the clock frequency. The clock recovery block 107 comprises an output coupled to a control input of the analogue-to-digital converter 101 for controlling its sampling phase or frequency. The clock recovery block 107 may further comprise another output for optional digital interpolation.

An output of the pre-filter 105 or an output of the Fourier transforming means 103 may be coupled to a Fourier transforming means 109 for transforming the frequency domain signal into time domain upon the basis of, for example, an inverse fast Fourier transform (IFFT).

The analogue-to-digital converter 101 may receive a signal corresponding to a single optical polarization or a plurality of distinct signals according to a plurality of different polarizations, e.g. according to a x- and a y-polarization. Thus, the analogue-to-digital converter 101 may output samples time domain signals $r_x[n]$ and $r_y[n]$, wherein n is an index.

According to an implementation form, the digital implementation applies blocks of the sampled sequences $r_x[n]$ and $r_y[n]$ after ADC, transferred into the frequency domain (FD) as $$S_x[m] = \text{FFT}\{Re\{r_x[n]\} + jIm\{r_x[n]\}\}$$

$$S_y[m] = \text{FFT}\{Re\{r_y[n]\} + jIm\{r_y[n]\}\}$$

with the FFT block size m=1, ..., M. The FD (Frequency Domain) representation of the signal may be extended to the double bandwidth, which relates to upsampling to 4 sps in the TD (Time Domain), to yield $S_{x,4}[m]$ and $S_{y,4}[m]$. After the digital pre-filter in by means of all-pass (APF) filtering and/or amplitude filtering (AF)

$$S_{x,Apre}[m] = S_{x,4}[m] \cdot H_{APF}[m] \cdot H_{AF}[m]$$

$$S_{y,Apre}[m] = S_{y,4}[m] \cdot H_{APF}[m] \cdot H_{AF}[m]$$

the ACF (Auto-Correlation Function) and the CCF (Cross-Correlation Function) may be calculated accordingly by $$U_{xx}[\tau] = \text{ACF}\{S_{x,Apre}[m]\}$$

$$U_{yy}[\tau] = \text{ACF}\{S_{y,Apre}[m]\}$$

$$U_{xy}[\tau] = \text{CCF}\{S_{x,Apre}[m], S_{y,Apre}[m]\}$$

The ACF delivers a stable clock tone for channels without half-Baud DGD, the CCF delivers stable clock tones for half-Baud DGD and multiples of it.

Alternatively, the ACF and the CCF may be defined by convolution functions using linear or circular convolutions. The combination $$U[\tau] = U_{xx}[\tau] + U_{yy}[\tau] + U_{xy}[\tau]$$

or $$U[\tau] = \text{ACF}\{S_{x,Apre}[m] + S_{y,Apre}[m]\}$$

may respectively deliver a stable criterion for all channel conditions. From $U[\tau]$ the clock tone is extracted to estimate the phase of the timing signal.

Also averaging over several FFT-blocks, averaging over several estimations and weighting functions $w[\tau]$ to improve the decision variable $U_{imp}[\tau] = w[\tau]U[\tau]$ may be employed.

Figure 2:
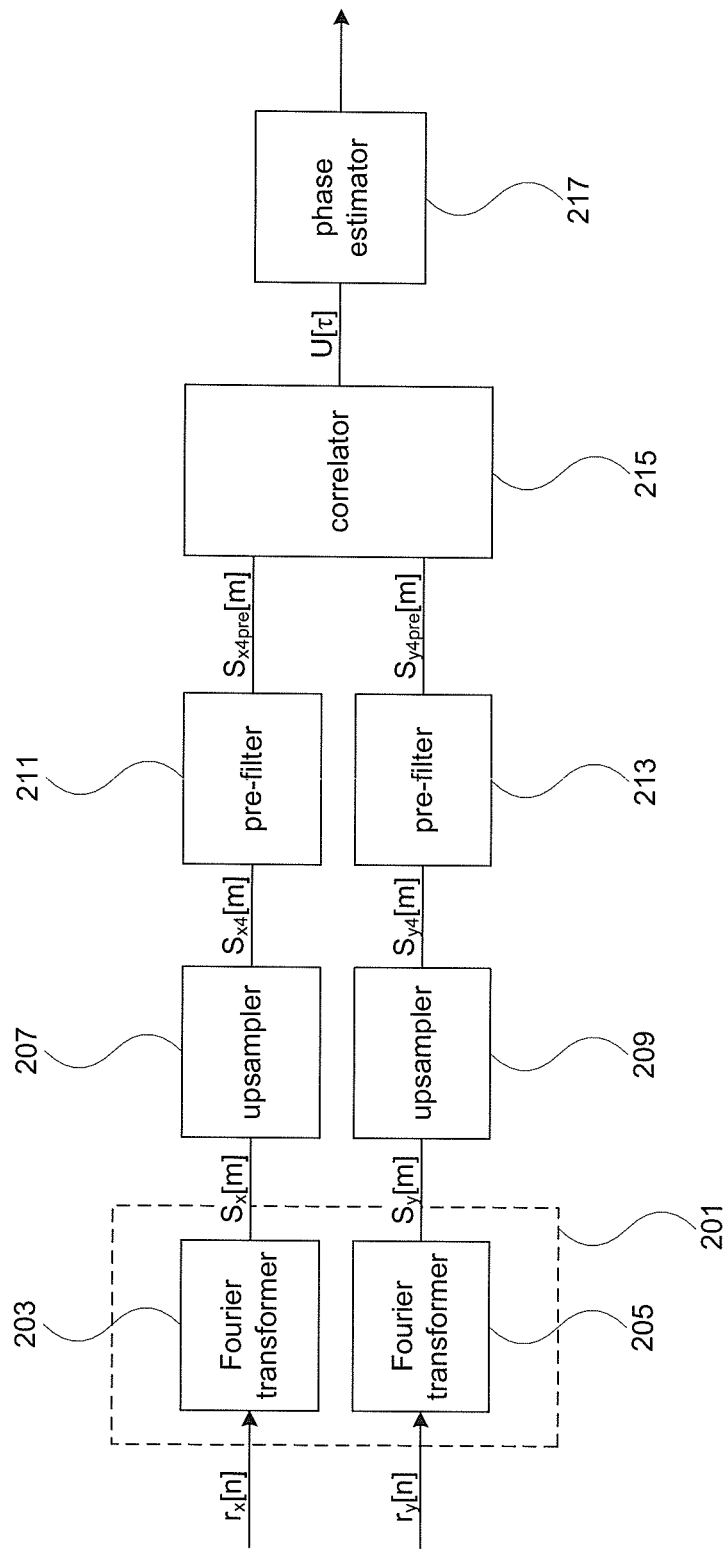
FIG. 2 shows a synchronization apparatus.

FIG. 2 shows a corresponding clock recovery apparatus comprising Fourier transforming means 201 with a first Fourier transformer 203 and a second Fourier transformer 205. The outputs of the Fourier transforming means are coupled to optional upsampling means having a first upsampler (US) 207 associated with the first Fourier transformer 203, and a second upsampler 209 associated with the second Fourier transformer 205. The outputs of the upsampling means are coupled to optional pre-filtering means comprising a first pre-filter (PF) 211 and a second pre-filter 213. The first pre-filter 211 is coupled to an output of the first upsampler 207, whereas the second pre-filter 213 is coupled to an output of the second upsampler 209. The outputs of the pre-filtering means are coupled to correlation means 215 having an output coupled to an optional phase estimator (PE) 217.

As depicted in FIG. 2, the time domain signal having the components $r_x[n]$ and $r_y[n]$ is transferred into frequency domain using the Fourier transforming means 201. The respective Fourier transformer 203 and 205 collectively provide a frequency domain signal having a first frequency domain signal portion associated with the x-polarization and a second frequency domain signal portion associated with the y-polarization. The frequency domain signals are subsequently upsampled to an equivalent of e.g. four samples per symbol in the time domain using the upsampling means.

Subsequently, pre-filtering means may be employed in order to bandpass filter the respective upsampled signals around the Nyquist frequency in order to enhance the clock tone and/or in order to all-pass filter the respective upsampled signals to compensate for chromatic dispersion. Subsequently, e.g. a cross-correlation function between the signals associated with the x- and the y-polarization, and the auto-correlation function for e.g. each signal according to the x- and y-polarization may be computed using the correlation means 215. By way of example, all correlation functions may be summed up in order to obtain an average value.

Alternatively, the first and the second frequency domain signal provided by the first and second Fourier transformer 203, 205, may be superimposed to obtain a superimposed frequency domain signal which may further be processed as depicted in FIG. 2.

Figure 3:
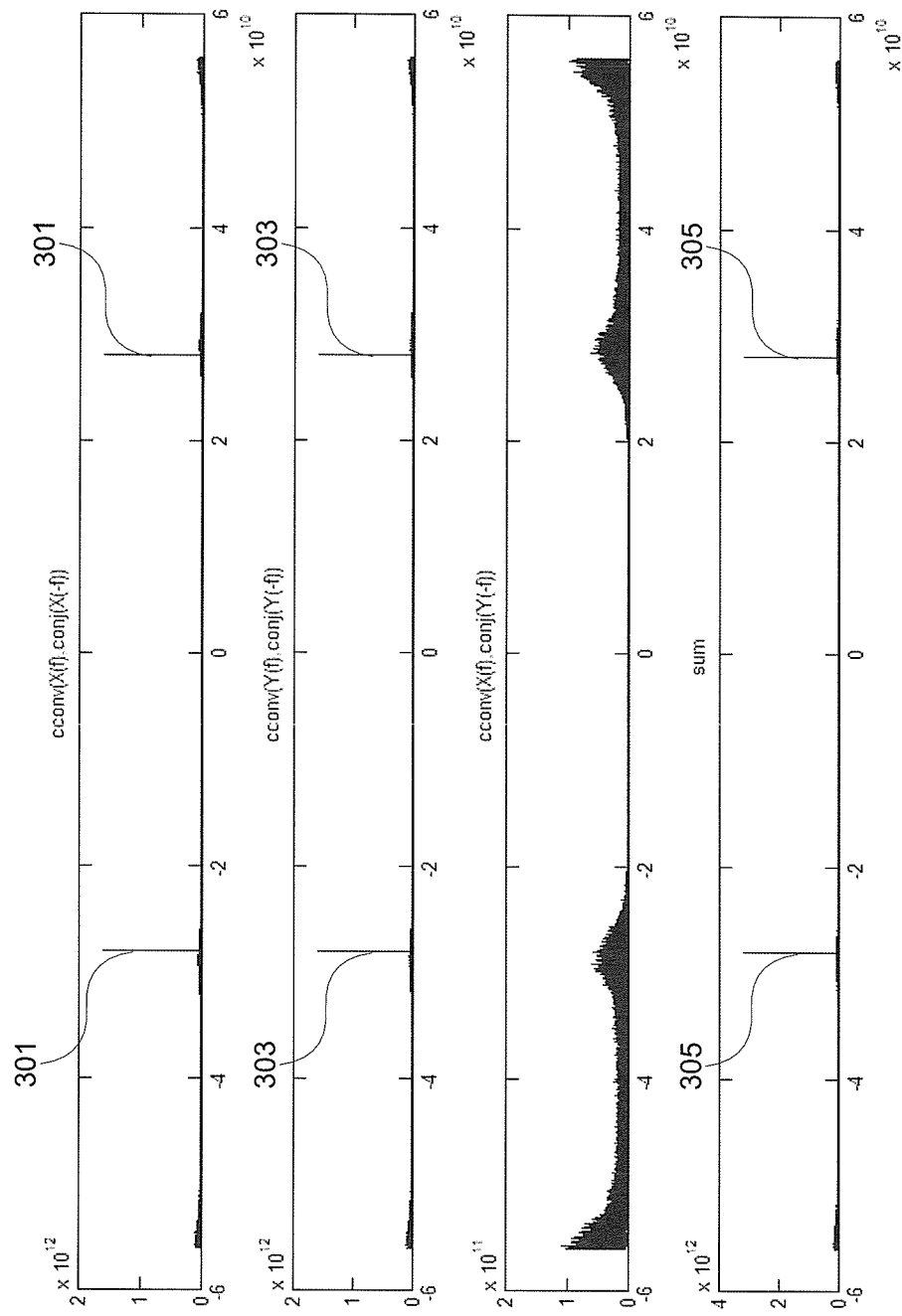
FIG. 3 shows simulation results.

FIG. 3 shows simulation results demonstrating the result of the correlation performed by the correlation means 215, wherein correlation values according to e.g. a cross-correlation scheme corresponding to a cross-convolution of signals X(f) and X(−f) over frequency are depicted. By way of example, certain correlation values 301, 303 or 305 have magnitudes greater than other correlation values, so that the frequencies associated with that correlation values may be assumed to correspond to the clock frequencies used at a transmitter. By way of example, the results shown in FIG. 3 are obtained for a differential group delay associated with 0 ps.

Figure 4:
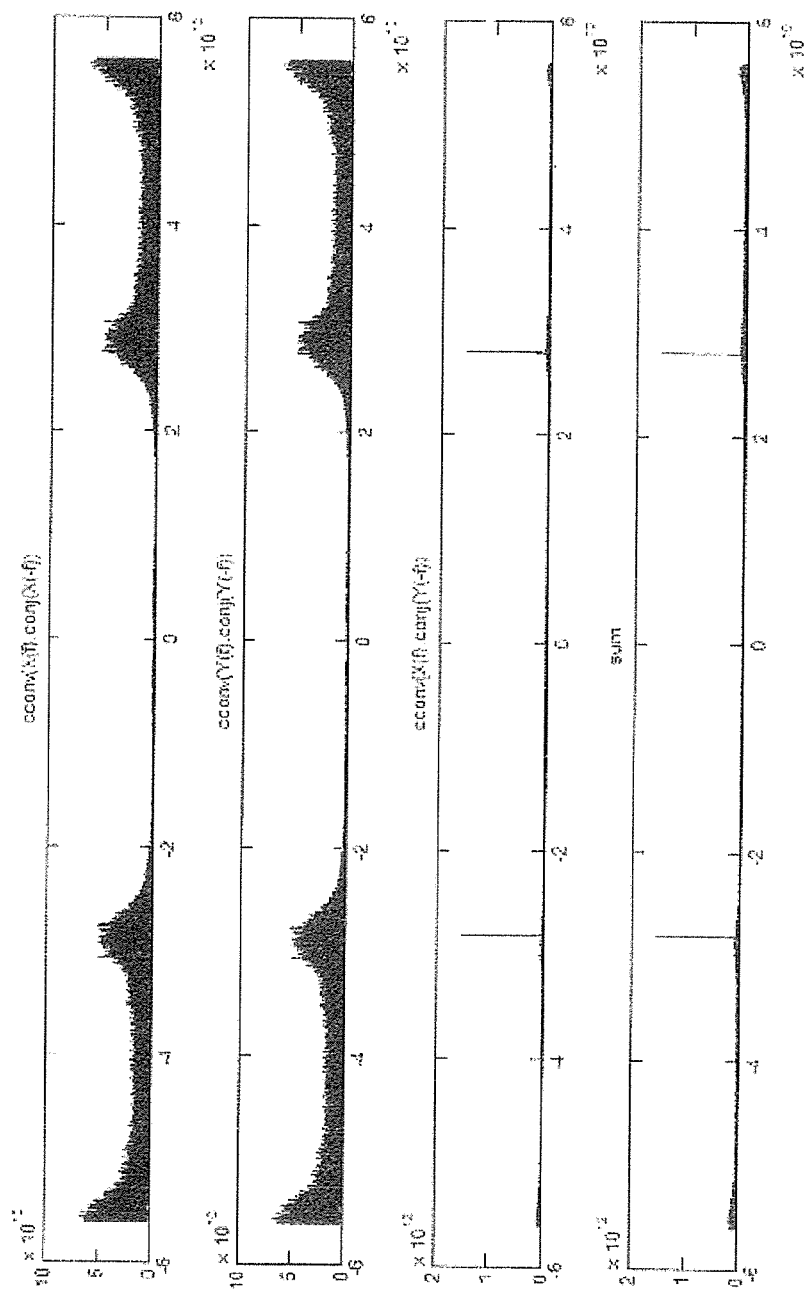
FIG. 4 shows simulation results.

FIG. 4 shows an example of estimation variable $U[m] = U_{xx}[m] + U_{yy}[m] + U_{xy}[m] + U_{yx}[m]$ for an SOP with theta=90 deg and phi=0 deg with half-Baud DGD of 17 ps. By way of example, only the CCF part includes the clock tone.

Figure 5:
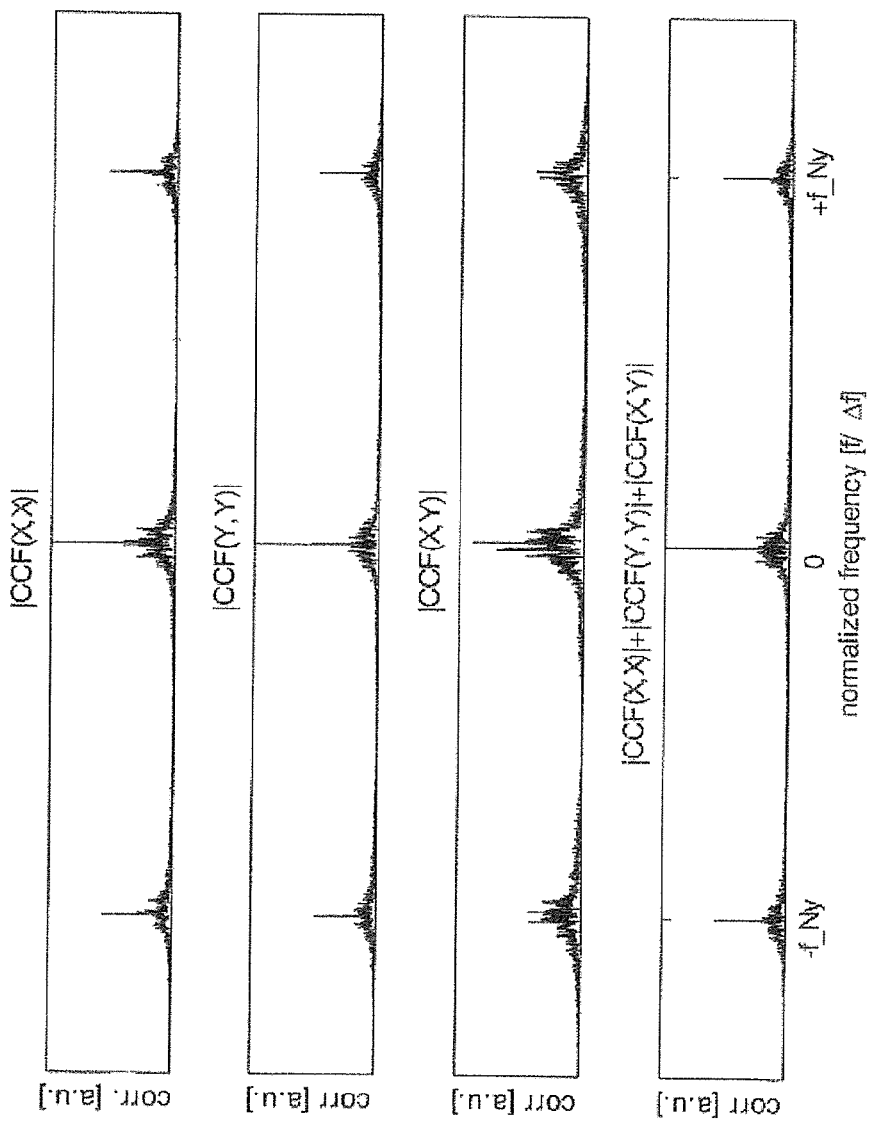
FIG. 5 shows simulation results.

FIG. 5 shows another example of estimation variable $U[\tau] = U_{xx}[\tau] + U_{yy}[\tau] + U_{xy}[\tau]$ for an SOP with theta=90 deg and phi=0 deg without DGD. In particular, in FIG. 5, absolute values of auto-correlation or cross-correlation values are depicted over normalized frequency, wherein fNy denotes the Nyquist frequency. The CCF(X, X) refers to the ACF(X). In contrast to FIG. 4, the clock tones are contained in the ACF components in FIG. 5.

Figure 6:
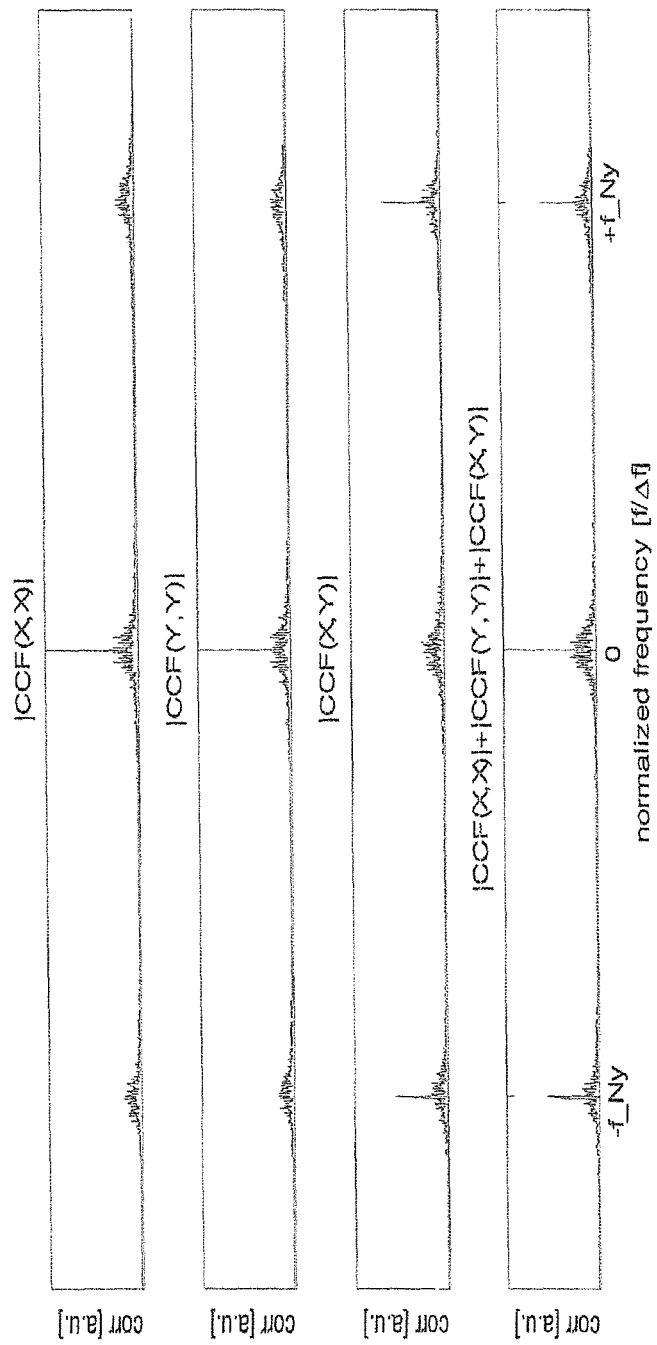
FIG. 6 shows simulation results.

FIG. 6 shows corresponding simulation results for a differential group delay of 17 ps.

As depicted in FIGS. 3 to 6, the particular frequency associated with the clock frequency may be detected by determining the correlation value exceeding other correlation values in a plurality of correlation values.

According to an implementation form, a FD representation of a signal after an optional all-pass filter comprising CD compensation and/or an amplitude filter comprising bandpass filtering may be used for the estimation of the clock tones. The pre-filter can be simply implemented by a scalar vector multiplication which does not require FIR pre-filter (FIR: Finite Impulse Response), and the amplitude and phase transfer function of the pre-filter can be arbitrarily chosen for any, e.g. optimized, value. Up sampling can be achieved by zero-padding which is the least complexity approach and does not degrade the signal quality since an interpolation FIR filter is not required. The equivalent operation of squaring the signal in the time domain (TD) refers to a correlation of the signal in the FD. A combination of auto-correlation of each polarization signal and cross-correlation of both polarization signals mitigates polarization effects, the half-Baud DGD in particular.

The closed loop bandwidth, essential for a fast tracking of time-varying timing phase variations, depends on the delay between the analogue-to-digital converter (ADC) and the feedback of the control signal. Extracting the timing phase from the FD signal, the time for processing the IFFT, the FIR filter for pre-filtering and interpolation is saved. This clearly increases the loop bandwidth and allows for faster tracking speeds mitigating more timing jitter and faster drifts. The inventive method is suitable for any modulation format as the properties in the spectral domain are similar for all modulation formats.

Figure 7:
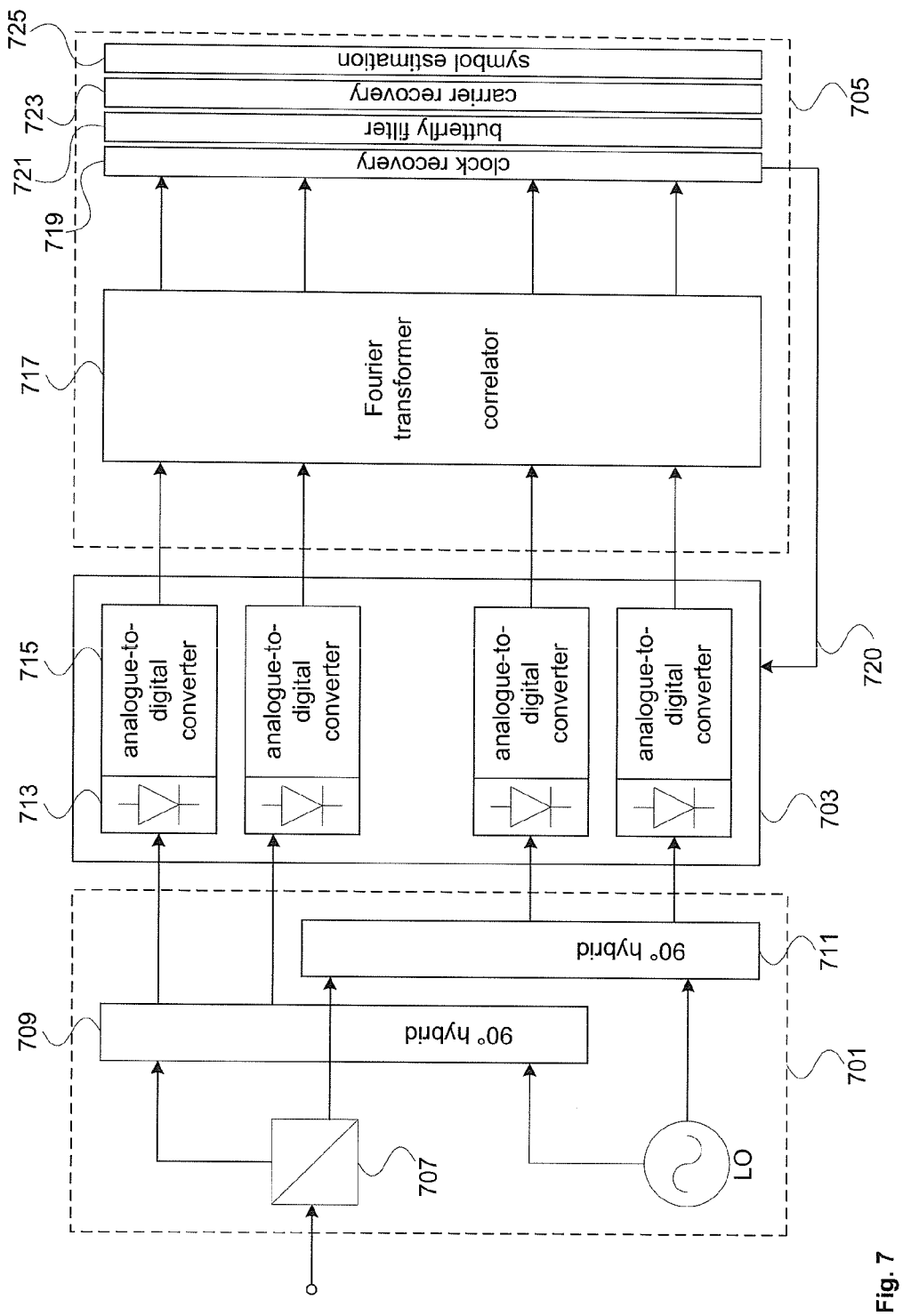
FIG. 7 shows a receiver comprising a synchronization apparatus.

FIG. 7 shows a receiver comprising an optical front end 701 coupled to a synchronization apparatus. The synchronization apparatus comprises optical-to-electrical converting means and analogue-to-digital converting means 703, which are coupled to a clock recovery apparatus 705.

The optical front end 701 comprises an optical splitter 707 providing a signal component according to the x-polarization to a first 90° hybrid 709, and a second signal according to the y-polarization to a second 90° hybrid 711. The 90° hybrids 709 and 711 respectively provide complex valued signals (each having a real and an imaginary value) to the analogue-to-digital converting means 703. Since the complex valued signals provided by the optical front end are optical signals, the analogue-to-digital converting means 703 may comprise, for each signal, an optical converter 713 for converting the respective optical signal into an electrical signal, and an analogue-to-digital converter (ADC) 715 for converting the respective electrical signal into a digital signal. The digital-to-analogue converting means 703 provides an input signal to the clock recovery apparatus 705, wherein the input signal may comprise a real and an imaginary portion associated with the x-polarization and a real and an imaginary portion associated with the y-polarization.

The clock recovery apparatus 705 may comprise a processor 717, the processor 717 comprising Fourier transforming means (FT) for transforming the time domain signals into the frequency domain, and correlating means to correlate the frequency domain signals according to the above described principles.

The correlation values and/or the cross-correlation values provided by the correlating means implemented within the processing means 717 are provided to clock recovery means 719 for recovering the clock frequency from the correlation values. The clock recovery means 719 may output a control signal 720 which is provided to the analogue-to-digital converting means 703 in order to adjust a sampling frequency or sampling phase for more accurately capturing the clock frequency.

The clock recovery apparatus 705 may further optionally comprise a butterfly filter 721, carrier recovery means 723 and/or symbol estimation means 725.

What is claimed is:

1. A clock recovery apparatus configured to recover clock information from an input signal, the apparatus comprising:
    Fourier transforming means configured to transform the input signal into a first frequency domain signal upon the basis of a Fourier transform by a first Fourier transformer and into a second frequency domain signal upon the basis of a Fourier transform by a second Fourier transformer;
    correlating means configured to correlate the first frequency domain signal to obtain a first correlation value associated with a first certain frequency and to correlate the second frequency domain signal to obtain a second correlation value associated with a second certain frequency; and
    clock recovery means configured to determine whether the first or second certain frequency corresponds to a clock frequency in order to recover the clock information.

2. The apparatus according to claim 1, wherein the clock recovery means is configured to decide that the first certain frequency corresponds to the clock frequency if the first correlation value is greater than the second correlation value.

3. The apparatus according to claim 1, wherein the clock recovery means is configured to decide that the certain frequency corresponds to the clock frequency if the correlation value is greater than or equal to a certain threshold.

4. The apparatus according to claim 1, wherein the clock recovery means is configured to output a control signal indicating a change of a sampling frequency or sampling phase if the certain frequency does not correspond to the clock frequency.

5. The apparatus according to claim 1, wherein the correlation means is configured to perform an auto-correlation of the frequency domain signal or to perform a cross-correlation of different portions to obtain the correlation value.

6. The apparatus according to claim 1, wherein the input signal is a digitized version of an optical signal having a first optical signal portion associated with a first optical polarization and a second optical signal portion associated with a second optical polarization, wherein the frequency domain signal comprises a first frequency domain signal portion associated with the first polarization and a second frequency domain signal portion associated with the second optical polarization, and wherein the correlation means is configured to auto-correlate the first or the second frequency domain signal portion or to cross-correlate the first frequency domain signal portion and the second frequency domain signal portion to obtain the correlation value.

7. The apparatus according to claim 1, wherein the correlation means is configured to weight at least a portion of the frequency domain signal or the correlation value with a weighting coefficient.

8. The apparatus according to claim 1, further comprising a filter configured to filter the frequency domain signal and to provide a filtered frequency signal as the frequency domain signal to the correlating means.

9. The apparatus according to claim 1, wherein the clock recovery means is further configured to determine a clock phase upon the basis of the correlation value.

10. The apparatus according to claim 1, further comprising oversampling means being configured to oversample the input signal prior to the Fourier transformation.

11. The apparatus according to claim 1, further comprising a Fourier transforming means configured to transform the frequency domain signal into time domain for further processing.

12. A method for recovering clock information from an input signal, the method comprising:
    transforming the input signal into a first frequency domain signal upon the basis of a Fourier transform and into a second frequency domain signal upon the basis of a Fourier transform;
    correlating the frequency domain signal to obtain a first correlation value associated with a first certain frequency and correlating the second frequency domain signal to obtain a second correlation value associated with a second certain frequency; and
    determining whether the first or second certain frequency corresponds to a clock frequency in order to recover the clock information.

13. A synchronization method, comprising:
sampling an analogue input signal with a sampling phase or frequency to obtain the input signal;
recovering a clock information from an input signal according to claim 12; and
changing the sampling phase or the sampling frequency to synchronize with a frequency corresponding to the clock frequency.

* * * * *